(No Model.)

B. HOLT.
TRAVELING HARVESTER.

No. 506,877. Patented Oct. 17, 1893.

Witnesses,

Inventor,
Benjamin Holt.
By Dewey & Co.
Attys

UNITED STATES PATENT OFFICE.

BENJAMIN HOLT, OF STOCKTON, CALIFORNIA.

TRAVELING HARVESTER.

SPECIFICATION forming part of Letters Patent No. 506,877, dated October 17, 1893.

Application filed March 13, 1893. Serial No. 465,823. (No model.)

*To all whom it may concern:*

Be it known that I, BENJAMIN HOLT, a citizen of the United States, residing at Stockton, San Joaquin county, State of California, have invented an Improvement in Traveling Harvesters; and I hereby declare the following to be a full, clear, and exact description of the same.

My invention relates to traveling harvesters and certain attachments thereto which will be more fully explained by reference to the accompanying drawings, in which—

Figure 1:
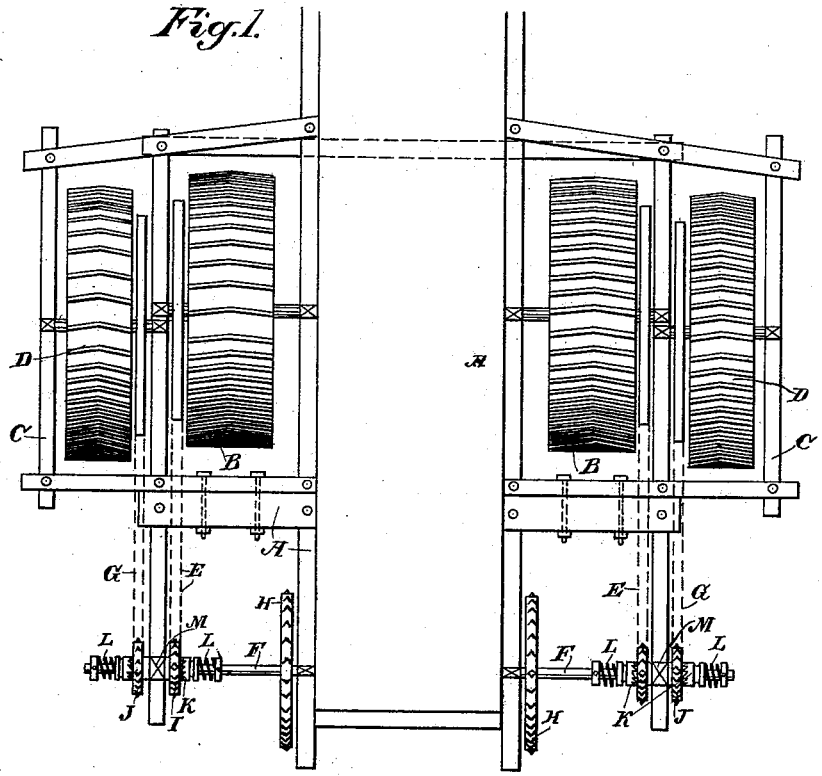
Figure 2:
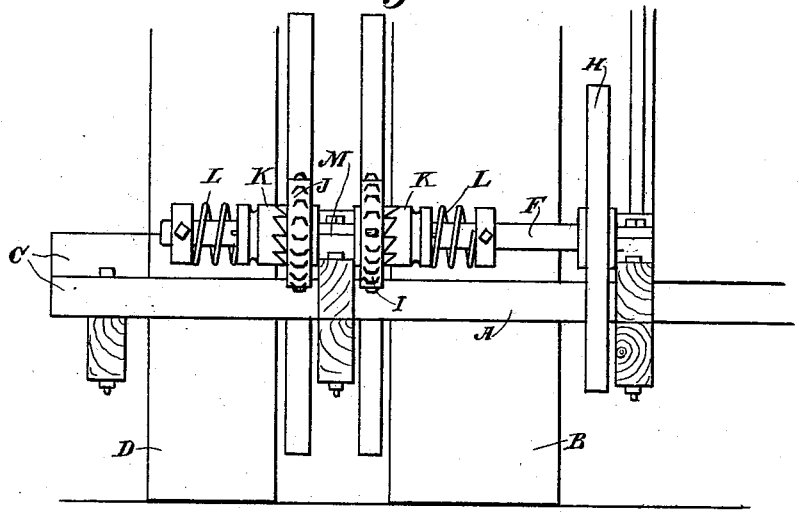

Figure 1 is a plan view. Fig. 2 is a rear end view.

The object of my invention is to provide an extended bearing and driving surface for traveling harvesters by the addition of another set of driving bearing wheels exterior to those ordinarily employed, so that the machine is capable of being worked over any very soft surface with much greater facility.

A is the frame of the harvester which is constructed in the usual manner, and has the bearing wheels B upon each side.

C are supplemental frames suitably bolted or secured to the main wheel frames and projecting beyond them upon each side. Within these frames are journaled the supplemental wheels D having independent shafts and boxes as shown.

The wheels B have sprocket-wheels secured to them, and motion is transmitted from these wheels through the driving-chain E to the counter-shaft F from which power is again transmitted through suitable sprocket-wheels H and driving chains to the thrashing and cleaning mechanism of the machine. The shaft F is extended outwardly beyond the sprocket-wheel which receives the driving-chain E, and has upon it a similar sprocket-wheel J around which passes a driving-chain G which is driven from a sprocket-wheel fixed to and turning with the supplemental wheel D. By this construction it will be seen that both the wheels B and D which are provided with projecting flanges or grousers, act upon the driving shaft F, and thus combine to drive the machinery of the thrasher. This is of great advantage, especially in soft or sandy ground, because, first, the additional support of the two sets of wheels, situated at a short distance apart, keeps the machine from settling into the ground so as to impede its working, the two sets of wheels also having double tractile force are not liable to slip, and the whole power of both wheels is transmitted to the working mechanism of the machine with little or no slippage even on the worst of surfaces.

It will be seen that when the machine turns in either direction, the outside wheels must travel over more ground than the inside ones. Therefore, it is necessary to have an automatic clutch connection between the sprocket-wheels I and J which are driven from the main sprocket-wheels, and the shaft F. This connection consists of the clutch members K which slide upon the feathers on the shaft, and are normally held up to contact with the corresponding clutch members on the sprocket-wheels I and J by springs L.

The sprocket-wheels I and J abut on the inside against the journal-box M, as shown, so that the spring-actuated members K are normally locked with them by the pressure of the springs L. The form of these clutch members is essentially like the inclined teeth of ratchet-wheels, so that when the shaft F is being driven by both the sprocket-wheels and chains, both the clutches will be engaged and power will be transmitted from both wheels to the shaft F. In turning, however, in any manner in which one wheel travels faster than the other, the engaging members of one of the clutches will slip past each other by reason of the sprocket-wheels I and J turning loosely upon the shaft, and will thus allow the one which is traveling the fastest to do the driving while the other will accommodate itself to the movements of this first one. By this construction the wheels are free to move at different speeds when turning corners, in which case the one which is being driven the fastest will temporarily drive the machinery, and when the apparatus is driving upon an approximately straight line, both sets of wheels will contribute to drive the machinery.

By having the supplemental frame timbers C bolted to the main frame, it will be manifest that whenever the machine is to be used in places where it is not necessary to use the supplemental wheels, either by reason of light work or because the surface of the ground is sufficiently good, these timbers can be unbolted and removed, leaving the machine in the condition of an ordinary traveling harvester with a single pair of bearing wheels.

Having thus described my invention, what I claim as new, and desire to secure by Letters Patent, is—

1. In a harvester or like machine, a supplemental frame carrying bearing and driving wheels and adapted to be removably secured to the main frame of the machine whereby the supplemental wheels assist the main bearing wheels in supporting the machine when traveling over soft or yielding surfaces.

2. In a traveling harvester, a main frame with main bearing and driving wheels journaled thereon, a counter-shaft and sprocket and driving wheels whereby power is transmitted thereto from the main bearing wheels, a supplemental removable frame attached to the main frame, supplemental bearing wheels journaled in said frame, and sprocket-wheels and chains whereby power is transmitted from said supplemental wheels to the counter-shaft, substantially as herein described.

3. In a traveling harvester, a main frame, main bearing and driving wheels journaled therein, and sprocket-wheels and chains whereby power is transmitted from the main driving wheel to a counter-shaft from which the thrashing and cleaning machinery is driven, a supplemental bearing and driving wheel journaled in a supplemental removable frame and having sprocket-wheels and chains whereby power is transmitted from the supplemental wheel to the counter-shaft and spring-actuated clutch mechanisms whereby the sprocket-wheels upon the counter-shaft are both driven by the respective main and supplemental wheels, or one is relieved by its clutch mechanism when the other one is driven at a higher rate of speed, substantially as herein described.

In witness whereof I have hereunto set my hand.

BENJAMIN HOLT.

Witnesses:
E. L. WILHOIT,
GEO. H. COWIE.